(12) United States Patent
Zheng et al.

(10) Patent No.: US 10,503,907 B2
(45) Date of Patent: Dec. 10, 2019

(54) INTELLIGENT THREAT MODELING AND VISUALIZATION

(71) Applicant: FMR LLC, Boston, MA (US)

(72) Inventors: Erkang Zheng, Cary, NC (US); Jason Kao, Cary, NC (US)

(73) Assignee: FMR LLC, Boston, MA (US)

( * ) Notice: Subject to any disclaimer, the term of this patent is extended or adjusted under 35 U.S.C. 154(b) by 499 days.

(21) Appl. No.: 15/379,129

(22) Filed: Dec. 14, 2016

(65) Prior Publication Data

US 2017/0169230 A1 Jun. 15, 2017

Related U.S. Application Data

(60) Provisional application No. 62/266,827, filed on Dec. 14, 2015.

(51) Int. Cl.
*G06F 11/00* (2006.01)
*G06F 21/57* (2013.01)
*G06F 17/50* (2006.01)
*G06N 20/00* (2019.01)

(52) U.S. Cl.
CPC ........ *G06F 21/577* (2013.01); *G06F 17/5009* (2013.01); *G06N 20/00* (2019.01)

(58) Field of Classification Search
CPC .... G06F 21/577; G06F 17/5009; G06N 20/00

USPC .......................................................... 726/22
See application file for complete search history.

(56) References Cited

U.S. PATENT DOCUMENTS

2007/0186284 A1* 8/2007 McConnell ............. G06F 21/55
726/25
2017/0060572 A1* 3/2017 Sripathan .................. G06F 8/70

* cited by examiner

*Primary Examiner* — Mohammad W Reza
(74) *Attorney, Agent, or Firm* — Proskauer Rose LLP (57) ABSTRACT

A computer-implemented system is provided for visualizing and analyzing security threats in a suite of software applications. The system includes a visualization module for rendering, on a computer display, a map with components representative of the suite of software applications and relationships among the software applications. The components are displayed in a base layer of the map. The system also includes a threat modeling module configured to automatically identify one or more security threats in the suite of software applications. The threat modeling module is adapted to interact with the visualization module to graphically depict on the computer display the one or more security threats on the map in a threat modeling layer. The system further includes a security controls module configured to implement security controls for mitigating the one or more security threats identified by the threat modeling module.

16 Claims, 6 Drawing Sheets

INTELLIGENT THREAT MODELING AND VISUALIZATION

RELATED APPLICATION

This application claims the benefit of and priority to U.S. Provisional Patent Application No. 62/266,827, filed Dec. 14, 2015, which is owned by the assignee of the instant application and the content of which is incorporated herein by reference in its entirety.

TECHNICAL FIELD

This application relates generally to systems, methods and apparatuses, including computer program products, for dynamically visualizing and analyzing security risks in one or more suites of applications.

BACKGROUND

With the growing complexity of application architecture and application infrastructure, it becomes tedious and often unmanageable to analyze application security across a large portion or an architectural stack. Today's threat modeling applications are often static and require either manual input or antiquated approaches to account for new architecture, code and/or infrastructure. Today's threat modeling approaches are also ineffective and unable to scale to hundreds or thousands of software applications in a complex, connected software application ecosystem. Additionally, traditional threat modeling mechanisms represent point-in-time state and cannot keep pace with the rapid changes in the software application landscape.

SUMMARY

Accordingly, there is a need for improved systems, methods and apparatuses for a more effective and efficient threat modeling approach in the context of application architecture and infrastructure. For example, the present invention features a system that can dynamically produce interactive and predictive threat models that can support real-time (or near real-time) risk analytics based on automated data aggregation and transformation, easy-to-understand visualization and sophisticated machine-learn techniques.

In one aspect, a computer-implemented system is provided for visualizing and analyzing security threats in a suite of software applications. The system comprises a visualization module for rendering, on a computer display, a map with components representative of the suite of software applications and relationships among the software applications. The components are displayed in a base layer of the map. The system also includes a threat modeling module configured to automatically identify one or more security threats in the suite of software applications. The threat modeling module is adapted to interact with the visualization module to graphically depict on the computer display the one or more security threats on the map in a threat modeling layer. The system further includes a security controls module configured to implement security controls for mitigating the one or more security threats identified by the threat modeling module, and a threat update module configured to determine a current state of the one or more security threats. The threat update module is adapted to interact with the visualization module to graphically display the current state of security on the map in a threat update layer.

In another aspect, a computer-implemented method is provided for visualizing and analyzing security threats in a suite of software applications. The method comprises visualizing in a computer display, as components in a base layer on a map, the suite of software applications and relationships among the software applications, automatically identifying one or more security threats in the suite of software applications, and graphically depicting on the computer display the one or more security threats on the map in a threat modeling layer. The method also includes implementing security controls for mitigating the one or more security threats identified by the threat modeling layer. The method further includes determining a current state of the one or more security threats, and graphically depicting on the computer display at least one of (i) a security controls layer illustrating the security controls applied to one or more components on the map or (ii) a security update layer illustrating the current state of security.

In some embodiments, a data flow module is configured to simulate a data flow through one or more of the software applications. The data flow module is adapted to interact with the visualization module to graphically illustrate on the computer display the simulated data flow through one or more components of the map that are representative of the one or more software applications. In some embodiments, an anomaly detection module is configured to predict an impact on at least one of the base layer or the threat modeling layer caused by a simulated security threat that is captured by the simulated data flow.

In some embodiments, the base layer visualizes each software application in the suite of software applications as a city and the suite of software applications as a state or country. The base layer can also visualize each relationship between the software applications as a road between different cities.

In some embodiments, the threat modeling layer visualizes each security threat as a threat actor, a threat target and a displayable vector connecting the threat actor to the threat target. At least one of the threat actor or the threat agent is a component of the map. The displayable vector can visualize an attack methodology by the threat actor on the threat target.

In some embodiments, a learning module is configured to automatically detect the one or more security threats in the threat modeling layer using a machine learning algorithm based on historical security threat data. The learning module can automatically detect the one or more security threats caused by a new component added to the map in the base layer.

In some embodiments, the security controls module is configured to display on the map at least one security control to reflect an effectiveness level of the at least one security control.

In some embodiments, the threat update module is configured to determine the current state of the one or more security threats by comparing a real-time snapshot of traffic in relation to one or more components on the map with a baseline state of traffic in relation to the same components.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

DETAILED DESCRIPTION

The present invention provides systems and methods for real-time (or near real-time) visualization of at least a portion of a company's application architecture and performing security risk analysis and threat detection based on the visualization. Specifically, by utilizing a visualization approach like cartography, application architecture can be represented in a compressible view that enhances security and risk analysis. For example, mapping techniques and concepts can be used in the context of data visualization to create a graphical representation of application connectivity and security.

Figure 1:
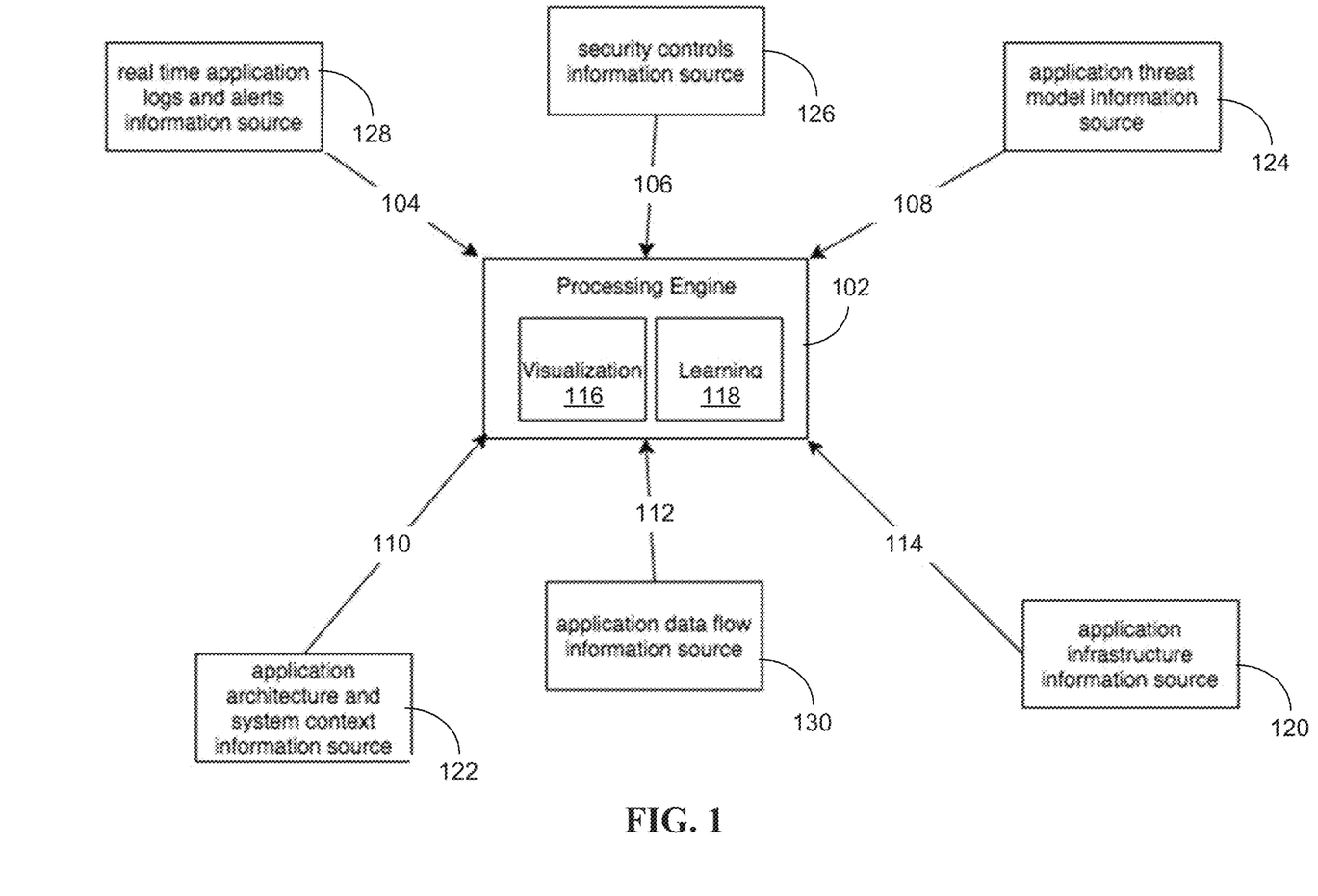
FIG. 1 shows exemplary architecture for constructing the security analysis system of the present invention.

In one aspect, a multi-layered visualization, similar to a map with overlaying layers (e.g., terrains, attractions, and traffics), is used to structure a security risk analysis system for detecting and mitigating security risks in application architecture. FIG. 1 shows exemplary architecture 100 for constructing the security analysis system of the present invention. As shown, the system 100 includes a processing engine 102 configured to take as inputs 104-114 system architecture data and/or security data from a variety of sources within a business enterprise, for example. In some embodiments, the processing engine 102 parses and analyzes the received data prior to passing the information to a visualization module 116 and/or a learning module 118 of the processing engine 102.

In some embodiments, using the input data, the visualization module 116 is configured to construct a multi-layered map structure having different layers for visualizing different sources of data from the inputs 104-114, which represent different aspects of the application architecture. The processing engine 102 also includes a learning module 118 configured to automatically and adaptively identify one or more potential security threats based on the input data. In some embodiments, the visualization module 116 and the learning module 118 are in electrical communication with one another such that the visualization module 116 can visualize the potential threats detected by the learning module 118 and the learning module 118 can detect new threats based on features illustrated by the visualization module 116.

Figure 2:
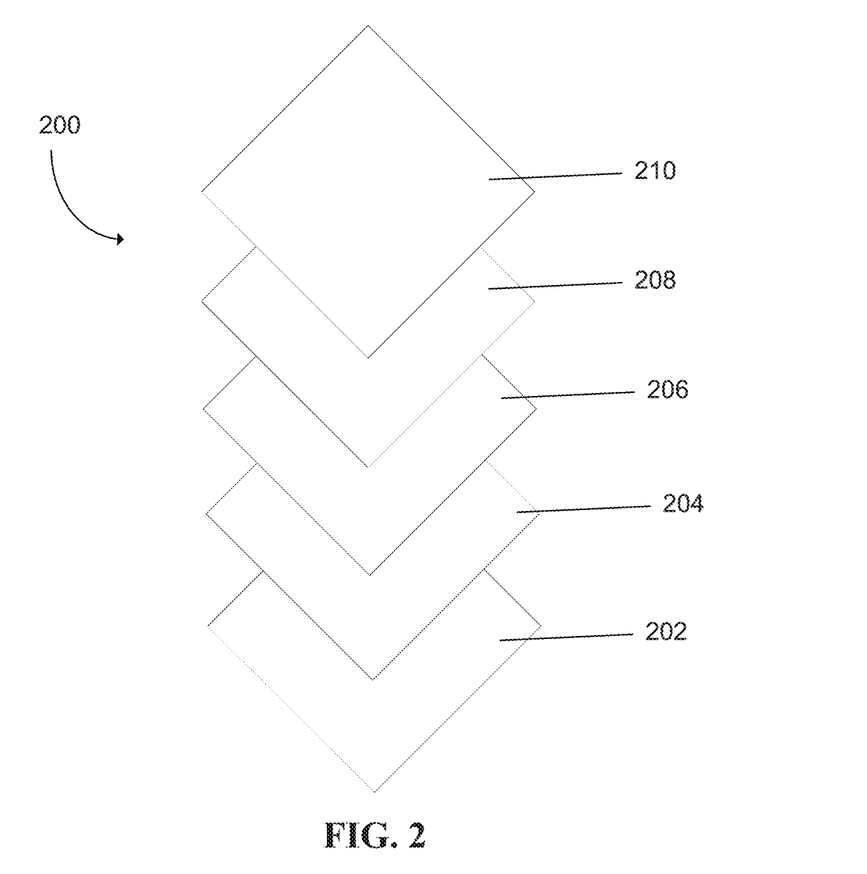
FIG. 2 shows an exemplary multi-layered structure that can be rendered in a computer display by the visualization module of the system architecture of FIG. 1.

FIG. 2 shows an exemplary multi-layered structure 200 that can be rendered in a computer display by the visualization module 116 of the system architecture of FIG. 1. As shown, the multilayered structure 200 includes four different overlaying layers, with the base layer 202 representing at least a portion of a company's application architecture. As described in detail below, the base layer 202 can visualize application components and relationships as a map to facilitate data extraction. The base layer 202 serves as the foundational piece of the security risk analysis system 100. The additional layers of the system 100 (akin to terrains, traffics, etc. of a map) include a layer representing threat modeling 204 of perceived threats, a layer representing security controls 206, a layer representing real-time (or near real-time) actual threats 208, and a layer representing simulated data flow 210 throughout the application ecosystem. These additional layers 204-210 can overlay the foundational map layer 202, similar to how traffic and other information (in addition to basic cartographical details) is represented on maps. These additional layers 204-210 can overlay the base layer 202 in the order as illustrated in FIG. 2 or any other order. As an example, in the threat update layer 208, if an application route is under "threat", the threat can be flagged similar to an accident, where a warning sign can be displayed and the affected road(s) can be highlighted in red. The threat can be scaled with different colors to provide an easy visualization of the type or severity of the threat. In general, the warning signs and icons displayed in each layer can represent the type of threat and/or control used to mitigate the threat and can provide a user-friendly approach to visualizing application security.

To generate and render the different layers of the multi-layered structure 200, the visualization module 116 can receive and process data from a variety of sources, as illustrated in FIG. 1. In some embodiments, the visualization module 116 generates and renders the base layer 202 to visualize a company's application architecture (e.g., suites of software applications and relationships among the software applications) as components in a map. Thus, the base layer 202 can be defined by application architecture and graphically constructed as a map to mirror the application landscape. The data used to construct the base layer 202 can be gathered and provided to the visualization module 116 from sources related to application architecture. For example, characteristics of each software application (e.g., interaction with other applications, relative size, etc.) can be used to generate features of the base layer 202 in a map-like environment. As shown, the visualization module 116 is adapted to receive (i) at input 114 information 120 related to the infrastructure of applications in one or more suites of applications and (ii) at input 110 information 122 related to the architecture of the individual applications and their system context. Such data 120, 122 can describe the complexity of one or more application suites with many dependencies and connections.

Based on the received information, the visualization module 116 can render, on a computer display, the base layer 202 by graphically depicting components of one or more application suites as components in a map. For example, the visualization module 116 can define individual applications as cities and different application suites as states or even countries. Routes between applications are visualized as roads, with different points within the map acting as other parts of the application architecture. Thus, an entire ecosystem can be seen as a country or state with many cities (representing applications) linked together by highways and/or roads (representing routes and/or calls). In some embodiments, to gain further levels of abstraction, a map can even have more granular details within a city, such as neighborhoods, blocks, and/or buildings representing small pieces of applications. To gain more detailed insights, the map can expand into more detailed components within an application, similar to zooming in to see the buildings within a city. In other embodiments, applications can be illustrated as nodes in a graph theory with connections among the nodes to illustrate their dependencies and connections.

In some embodiments, the visualization module 116 generates and renders the threat modeling layer 204 in a computer display to visualize predicted security objectives, threats and/or vulnerabilities of the application architecture in the base layer 202. The visualization can be rendered in the same application landscape as (e.g., overlays) the base layer 202. Generally, data in the threat modeling layer 204 can be organized into threat agents, vectors, and targets. The threats can also be categorized into different types. Each threat can be visually associated with at least one of (i) a threat actor application, (ii) a threat target application and (iii) a displayable vector connecting the two to represent and visualize a particular attack methodology. For example, a vector connection can be a data flow path between one or more cities or between one or more buildings. A threat can provide one-to-one mapping between a threat actor and a threat target, a one-to-many mapping, a many-to-one mapping or a many-to-many mapping, depending on the nature of the threat.

These security risks can be manually and/or automatically identified by a threat modeling module 124 that is configured to interact with the visualization module 116 and supply data to the visualization module 116 via the input 108 for graphically depicting the identified risks. In one example, identification of a security threat can be performed manually by security personnel. In another example, identification of a security risk is automatically determined based on predefined rules or conditions by the threat modeling module 124 working in conjunction with the learning module 118 of the processing engine 102. For instance, when new routes and/or applications are added to the base layer 202 and preexisting route(s) are present to connect the threat agent to the target application, the threat modeling module 124 can interact with the learning module 118 to automatically predict new attack routes. Details regarding automatic identification of security threats by the threat modeling module 124 and the learning module 118 are described below with respect to FIGS. 6 and 7. Generally, the threat modeling module 124 and the learning module 118 can determine faults in application designs by reviewing not only individual applications, but also connections among applications in the application ecosystem.

In some embodiments, the visualization module 116 generates and renders the security controls layer 206 in a computer display to visualize one or more security controls used to mitigate or eliminate threats identified by the threat modeling layer 204 for the purpose of securing applications. The security controls can be identified and/or implemented by a security controls module 126 that, for example, enacts the security controls as a combination of infrastructure security controls and application-specific ones. The standard security controls (e.g., network traffic analyzer, encryption scheme, and/or authentication service) can be triggered and added once certain key categories/models are provided.

The security controls module 126 can interact with the visualization module 116 and supply data to the visualization module 116 via the input 106 for graphically illustrating the one or more security controls in the security controls layer 206. In some embodiments, the display of a security control can reflect the degree of its effectiveness in mitigating threats in the thread modeling layer 204. For example, a web application firewall, which is a type of infrastructure security control, can block 30% of the threats. Such level of effectiveness can be less than a data validation control, which is a type of application-specific security control, configured to block 60% of the threats. Hence, the security controls layer 206 can represent the web application firewall as a dimming icon (or other scalable change) with less intensity than the representation for the data validation control. Both security controls are stackable. If both are selected for implementation, the representation in the security controls layer 206 is more intense to notify a user that the combined effectiveness is greater than just selecting either infrastructure or only application security controls.

In some embodiments, the visualization module 116 generates and renders the threat update layer 208 in a computer display to visualize real-time (or near real-time) changes in the application landscape that may be a security threat. These changes can be monitored and/or aggregated by a threat update module 128. Specifically, the threat update module 128 can be configured to monitor traffic, data flows, and other real-time aspects of applications in one or more of the base layer 202, the threat modeling layer 204, and the security controls layer 206. The threat update module 128 can interact with the visualization module 116 and supply data to the visualization module 116 via the input 104 for graphically illustrating the changes to the application landscape in the threat update layer 208.

In some embodiments, the threat update module 128 causes the threat update layer 208 to adjust visualization of various aspects of the application landscape by comparing a baseline state of the application landscape with a real-time (or near real time) snapshot of the same components. For example, if traffic flow reflects about 10,000 users every minute for a certain application and a baseline measurement of traffic flow for the application is 10,000 users, a certain color (e.g., green) can be used by the threat update layer 208 to reflect this normal activity. However, if suddenly 100,000 users per minute are accessing the application, the threat update layer 208 can change the color to red to alert the end user of the detected threat. The threat update layer 108 can use specific formulas and code to calculate the baseline as well as visualization adjustment by taking into account of the current state, load handling of a specific application, and other relevant factors. For example, the difference between the baseline and current conditions can be a threshold calculation that is learned or adjusted by a user. The baseline state can be an average of healthy traffic flow patterns under substantially similar conditions monitored over a period of time. The difference between the baseline and current state can be determined and certain factor can add multipliers to the difference, such as the load handling performance (e.g., if the performance is low, the multiplier is high). If the difference is over a predetermined risk threshold, alerts can be raised and color of pertinent components on the map can be changed to indicate the detected threat. As explained above, the threat update layer 208 can visualize a current state of the security threats in the application ecosystem as well as changes in the current state of security compared to a baseline state of security.

In some embodiments, the visualization module 116 generates and renders the simulated data flow layer 210 in a computer display to visualize a path of simulated data flow throughout the application ecosystem, analogous to the different types of traffic that can travel on roads including, for example, bicycle-only routes, roads only allowing cars, and railroads only allowing trains on a map. The simulated data flow can be of different types including, but not limited to, public, confidential, PII, authentication/authorization, configuration, logging, runtime code, etc. When data traffic looks atypical on a road, the data flow layer 210 can visually identify the problem. For example, given a connecting route between applications that is configured to conduct public information (e.g., represented by bicycles), if highly confidential customer information (e.g., represented by a car) travels on that route, the problem can be visually identified. In some embodiments, the simulated application data flow information can be supplied to the visualization module 116 by the data flow module 130 via the input 112. The simulated data flow information can include data describing simulated traffic through one or more components (i.e., software applications) of the map in the base layer 202. For example, the simulated data flow can represent known traffic patterns and/or live traffic patterns to assist in the detection of anomaly and potential attacks.

In some embodiments, the security risk analysis tool 100 of the present invention is used to predict future attacks, in addition to detecting current attacks in real time (or near real time). For example, a user can use the data flow module 130 of the system 100 to specify data flows to simulate attacks and/or perform testing to predict future attacks. Specifically, a user can use the data flow module 130 to test whether security controls are robust enough to meet different types of attacks, either real or simulated. By using knowledge about attacks and traffic (e.g., knowledge gained from the threat update layer 208 that examines traffic, data flow, and other real-time aspects of software applications), a user can provide data through the data flow module 130 to simulate certain scenarios and predict how existing applications (modeled as the multi-layered structure 200 of FIG. 2) react to the built-in security controls. This facilitates prediction of future potential threat vectors for various applications and development of possible remediation strategies. In some embodiments, the prediction models and simulations can be used to prepare for zero-day attacks by simulating real potential attacks and behaviors. Generally, using the security risk analysis system 100 to make simulations and predictions can prepare a user for both known and unknown threats.

In some embodiments, data in the different layers described above can be sorted into different categories. For example, in the simulated data flow layer 210, data can be categorized as Public, Confidential, Authorization, and API. In the security controls layer 206, data can be categorized as Application and Infrastructure. In the threat modeling layer 204, data can be categorized as Threat Actors, Attack Vectors, and Targets.

In some embodiments, the data visualized at each layer of the multi-layered structure 200 of FIG. 2 can interact with each other and superimpose relative to each other to create a dynamic visual result. When displaying the multi-layered structure 200, elements from one layer can be presented differently depending on selection of other layers. The display of each layer can be enabled or disabled by a user of the system 100. Different combinations of layers can result in different information being presented in the resulting visualization because different combinations of layers can have different types of interactions. For example, with respect to the interactions between the threat modeling layer 204 and the security controls layer 206, most or all potential threats of the threat modeling layer 204 can be visible if the threat modeling layer 204 is enabled on top of the base layer 202 without the security controls layer 206 being enabled. However, if both the threat modeling layer 204 and the security controls layer 206 are enabled, threats that are mitigated by the corresponding security controls of the security controls layer 206 can be hidden. In some embodiments, effective security controls that can mitigate one or more modeled threats can be visualized as graying out the modeled threats. In some embodiments, only residual risk unable to be resolved by the security control layer 206 can be visualized. In another example, with respect to the interactions between the threat modeling layer 204 and the security update layer 208, the visualization module 116 can simply add/overlay real-time threats from the security update layer 208 to the threats predicted from the threat modeling layer 204. Specifically, the real-time threats can coincide with the threats modeled and provide more information about risks to application security.

Figure 3:
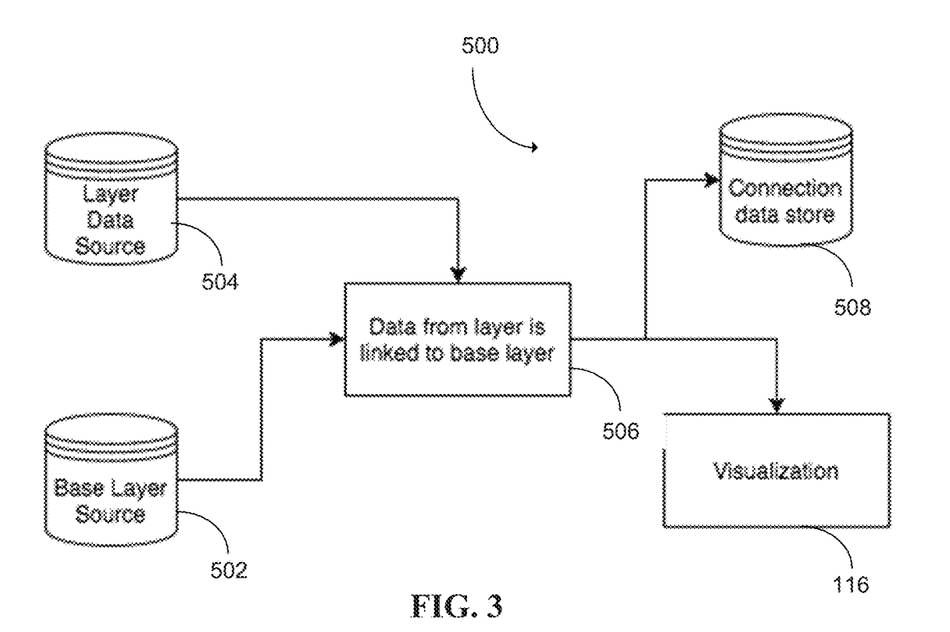
FIG. 3 shows an exemplary layer creation flow diagram for visualizing various layers in the multi-layered structure of FIG. 2.

FIG. 3 shows an exemplary layer creation flow diagram 500 for visualizing various layers of the multi-layered structure 200 of FIG. 2. Information used by the security risk analysis system 100 for visualizing and predicting security risks can be stored in one or more database tables. Depending on which layer(s) are selected by a user for visualization, data corresponding to the selected layers (in addition to the base layer 202) can be retrieved from their corresponding database tables and configured to interface with data from the base layer 202 to add interactive controls to the applications in the base layer 202.

In some embodiments, at least one database table is used to store data for each layer and for each possible combination/interaction of the layers. As shown in FIG. 3, data for the base layer 202 can be stored in a base layer database table 502. Data for one or more additional layers can be stored in their corresponding database tables 504. Further, data representing various combinations/interactions of the layers can be stored in their corresponding database tables 504. For example, given 3 layers A (e.g., representing the threat modeling layer 204), B (e.g., representing the security controls layer 206), and C (e.g., representing the threat update layer 208), six database tables can be generated to represent the combinations {A, B, C, AB, AC, BC, ABC} that are stored in the database tables 504.

During visualization, data related to the base layer 202 is retrieved from the base layer database table 502, where the base layer data serves as the foundation for visualization. In some embodiments, if no layer is selected, information corresponding to the base layer 202 is visualized by default. Further, depending on which additional layer(s) are selected by a user for visualization, data corresponding to the selected additional layers and data corresponding to pertinent interactions among the selected layers can be retrieved from their respective database tables 504 and supplied to a linking module 506. The linking module 506 can be configured to interface the layer data (for the additional layers) and the interaction data (among the additional layers) with the data from the base layer 202 to add interactive controls to the applications in the base layer 202. The linking module 506 can forward data corresponding to all the layers (including the base layer 202), the interaction data and the linking information to the visualization module 116 for graphical display. The linking module 506 can also forward the same data to the connection database 508 that is configured to store connections/links that describe the relationships among the components on each layer and/or between different layers. Continue with the same example described above, if layer A is selected, information corresponding to the base layer 202 and information in the database table for layer A is visualized by the visualization module 116. If layers A and B are selected, information corresponding to the base layer 202 and information in the database tables for layer A, layer B and interactive layer AB is visualized. If layers A, B and C are selected, information corresponding to the base layer 202 and information in the database tables for layer A, layer B, interactive layer AB, interactive layer BC and interactive layer ABC is visualized. If no layer is selected, information corresponding to the base layer 202 is visualized by default.

Figure 4:
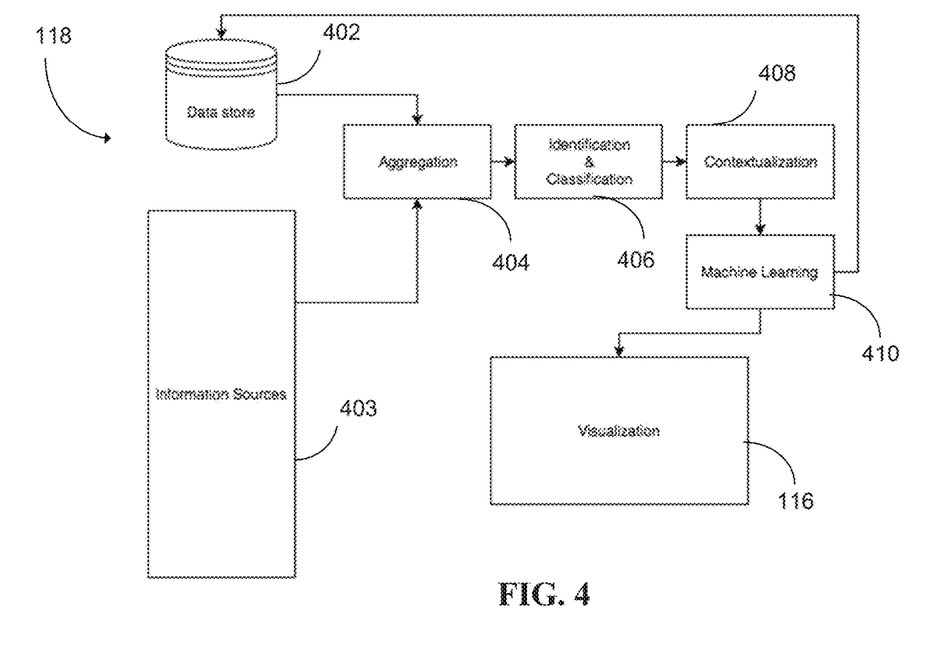
FIG. 4 shows an exemplary implementation of the learning module of the system of FIG.

FIG. 4 shows an exemplary implementation of the learning module 118 of FIG. 1. Generally, the learning module 118 includes a database 402 for storing pertinent data related to the different layers of the multi-layered structure 200. The learning module 118 can also obtain further information about the different layers from multiple information sources 403, similar to the sources 122, 128, 126, 124, 120, 130 explained above with respect to FIG. 1. The aggregation module 404 can compile/collate the data from the database 402 and the sources 403 and supply the aggregated data to an identification & classification module 406 for further organization (e.g., assign where the aggregated data belongs given similarities determined, for example, by a machine learning algorithm). The organized data is supplied by the identification & classification module 406 to the contextualization module 408 that determines how the data fits within the overall application ecosystem and assigns a context to the data. The contextualized data can be supplied by the contextualization module 408 to a machine learning module 410 that is configured to determine historical attack patterns/behavior based on the contextualized data. In some embodiments, one or more of the modules 404, 406, 408 and 410 have some degree of machine learning built in. In some embodiments, data related to the threat patterns detected by the machine learning module 410 is supplied to the visualization module 116 for graphical display, such as in the threat modeling layer 204 that overlays the base layer 202.

Figure 5:
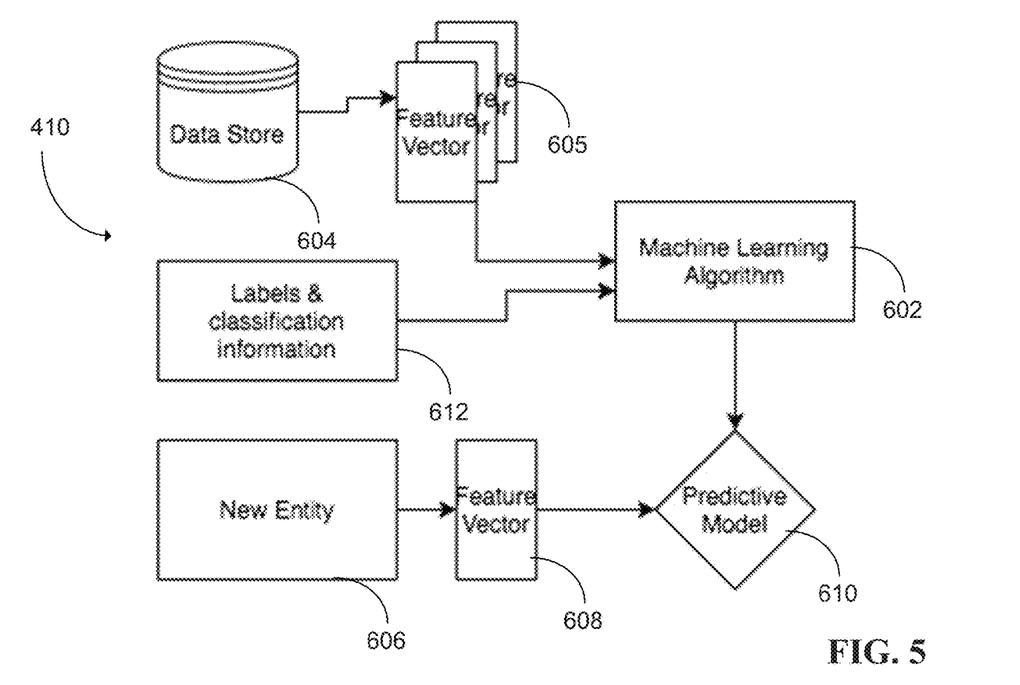
FIG. 5 shows an exemplary implementation of the machine learning module of the learning module of FIG. 4.

FIG. 5 shows an exemplary implementation of the machine learning module 410 of FIG. 4. The machine learning module 410 can automatically detect a potential threat in an application ecosystem in response to receiving new data related to the application ecosystem and can classify the new data accordingly (e.g., threating or non-threating). As shown, the machine learning module 410 can apply a machine learning algorithm 602 to determine threat patterns based on historical information (e.g., represented as one or more historical feature vectors 605) stored in a database 604. The historical information can include attributes corresponding to historical components and/or threats. Additional identification and classification information 612 regarding the historical components and/or threats can be supplied to the machine learning algorithm 602. When a new component (e.g., a new software application) 606 is detected in the application ecosystem, either manually or using an automated data gathering approach (e.g., scanning), the new component 606 can be added to the base layer 202 as a new feature vector 608. The machine learning module 410 can use a predictive modeling technique 610 to determine whether there is any new threat associated with the addition of the new component 606 based on the historical threat patterns from the machine learning algorithm 602 as well as attributes associated with the new component 608. Further an anomaly detection module (not shown) can be used by the machine learning module 410 to predict the impact of the new threat across the application ecosystem, including on areas where the threat does not directly affect. For example, the anomaly detection module can analyze attributes and impact of the new threat across the application ecosystem such that a mismatch or anomaly in attributes can be identified as a part of an end-to-end flow. This anomaly detection is described below with reference to FIG. 6. Thus, the machine learning module 410 can classify the new component 606 based on whether a potential threat is associated with the new component 606 and/or the extent of impact of the new threat.

In some embodiments, the detected potential threat is automatically linked to the new component 606 and/or to the connection between the new component 606 and the existing ecosystem in the base layer 202. For example, the new threat can be incorporated in the threat modeling layer 204.

Generally, each feature vector of the feature vectors 605, 608 represent attributes applied to a component of the base layer 202. For example, an application can have attributes identifying a type (e.g., web, desktop, mobile or database), programming language, whether it is internal or external, number of users, criticality, business impact rating, connected systems, etc. These attributes can be organized into a feature vector corresponding to the particular application. In addition, a subsystem of multiple applications can be associated with a feature vector identifying attributes including logging activity, authentication, authorization, data input, data processing, etc. Also, a data flow can be associated with a feature vector identifying attributes such as origination, destination, data type, entry and exit points, paths, etc. Further, a threat can be associated with a feature vector identifying attributes such as CIA (confidentiality, integrity, availability) impact, STRIDE category, CWE (common weakness enumeration) mapping, threat actor, attack surface, attack vector, target, complexity, probability, impact, etc.

Figure 6:
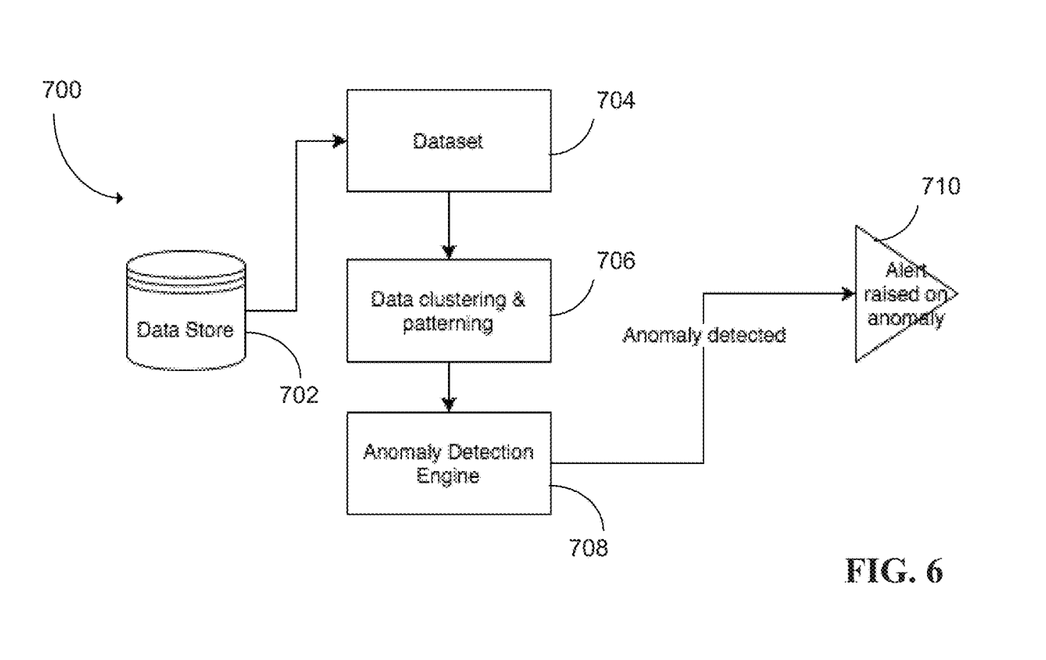
FIG. 6 shows an exemplary anomaly detection system that can be incorporated into the learning module of the system of FIG. 1.

FIG. 6 shows an exemplary anomaly detection system 700 that can be incorporated into the learning module 118 of the system 100 of FIG. 1 (e.g., in the machine learning module 410 of FIGS. 4 and 5) for determining the impact of a threat across an application ecosystem. The anomaly detection system 700 includes a database 702 that can store data related to know or historical attacks, such as denial-of service attack or recently discovered zero-day vulnerabilities. For simulation processes, these threats, vulnerabilities, or attacks are available for a user to place, as one or more datasets 704, on an application, a group of applications, or a data flow link in the application ecosystem of the base layer 202 in the interactive visual interface. Each vulnerability or attack can have a certain associated impact, such as taking a target application offline, stealing data from the application, etc. Not only does an attack impact directly-targeted applications, it can also have far-reaching impacts across the entire ecosystem. An anomaly detection engine 708 of the system 700 can simulate these direct and indirect impacts across the connected ecosystem. For example, the anomaly detection engine 708 can detect the direct impact of a simulated attack on one or more target applications and use the connectivity of the target applications and their attributes to detect any far-reaching impacts. In some embodiments, the datasets 704 is pre-processed by the processing module 705, such as clustered based on similar attributes to form patterns and otherwise organized, prior to being supplied to the anomaly detection engine 708. If an anomaly is detected by the anomaly detection engine 708, an alert can be raised 710 to visually and/or audibly warn the user of the anomaly.

The anomaly analysis implemented by the anomaly detection system 700 is useful for understanding the impact of a penetration test without actually causing the fault/attack in the application infrastructure. It is also useful for demonstrating the effectiveness of any compensating security controls that can put in place to address the simulated attacks. For example, an affective compensating control may cause minimal to no far-reaching impact across the application ecosystem even though the targeted application can be impacted.

Figure 7:
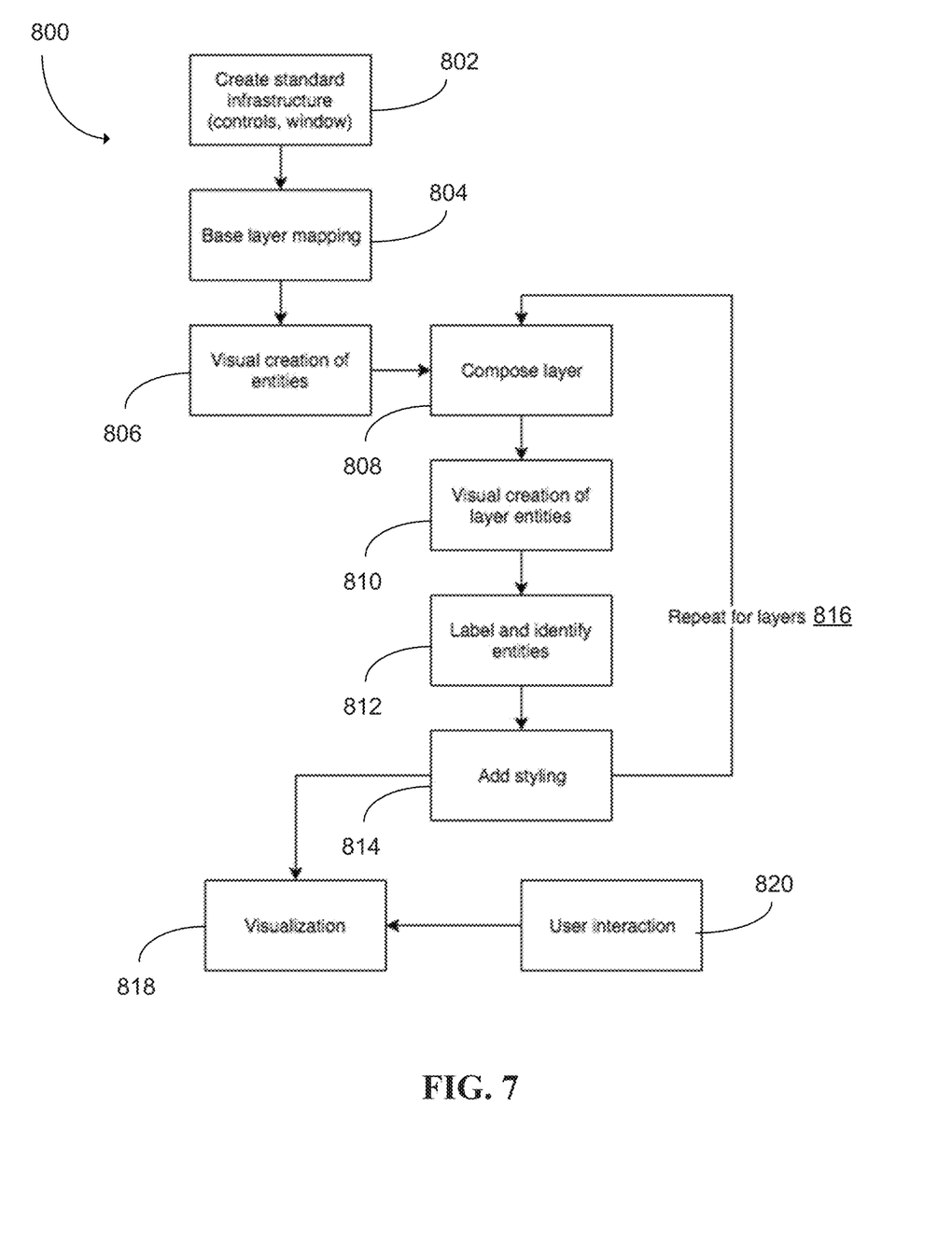
FIG. 7 shows an exemplary computer-implemented process for visualizing and analyzing security risks in a suite of applications using the system of FIG. 1.

FIG. 7 shows an exemplary computer-implemented process 800 for visualizing and analyzing security risks in a suite of applications using the system 100 of FIG. 1. The process starts by creating standard infrastructures, such as controls and windows, in preparation for graphically displaying a multi-layered structure, such as the structure 200 of FIG. 2 (step 802). First, the visualization module 116 can visualize the suite of applications and relationships among the applications as components of a map in a base layer 202 of the multi-layered structure (step 804). The visualization module 116 can create the base layer 202 using information 120 related to the infrastructure of the applications and information 122 related to the architecture of the applications and their system context. The visualization module 116 can also create one or more additional layers overlaying the base layer 202 (step 806). For each additional layer, the visualization module 116 can compose the layer (step 808) by creating one or more entities for the layer (step 810) as well as one or more labels to identify the entities (step 812). Optionally, styling can be added to the layer visualization (step 814). Steps 808-814 can be repeated (step 816) for each additional layer desired by a user for visualization (step 818). For example, the visualization module 116 can visually identify one or more predicted security threats by creating a threat modeling layer 204 overlaying the base layer 202. The visualization module 116 can implement security controls for mitigating the one or more security threats identified by the threat modeling layer 204 and display the security controls in a security controls layer 206 overlaying the base layer 202. The visualization module 116 can adjust the visualization of the one or more component on the map of the base layer 202 to indicate a current state of the security threats in a threat update layer 208. For example, visualization module 116 can impose the threat update layer 208 on top of the base layer 202 to show real time (or near real time) threats on the various components of the base layer 202.

A user can interact with the resulting visualization (step 820) to achieve the desired display effects. In some embodiments, at least one of the base layer 202, the threat modeling layer 204, the security controls layer 206, or the threat update layer 208 has sub-categories in the layer that can be toggled (e.g., enabled or disabled) by the user. For example, a particular type of threats in the threat modeling layer 204 can be toggled on or off to provide more focused visualization. In some embodiments, the visualization module 116 allows panning and/or zooming of the visualized structure. Depending on what information is graphically illustrated in the computerized display window, the visualization module 116 can display different information and/or hierarchies of information upon receiving a panning or zooming command from a user.

Figure 8:
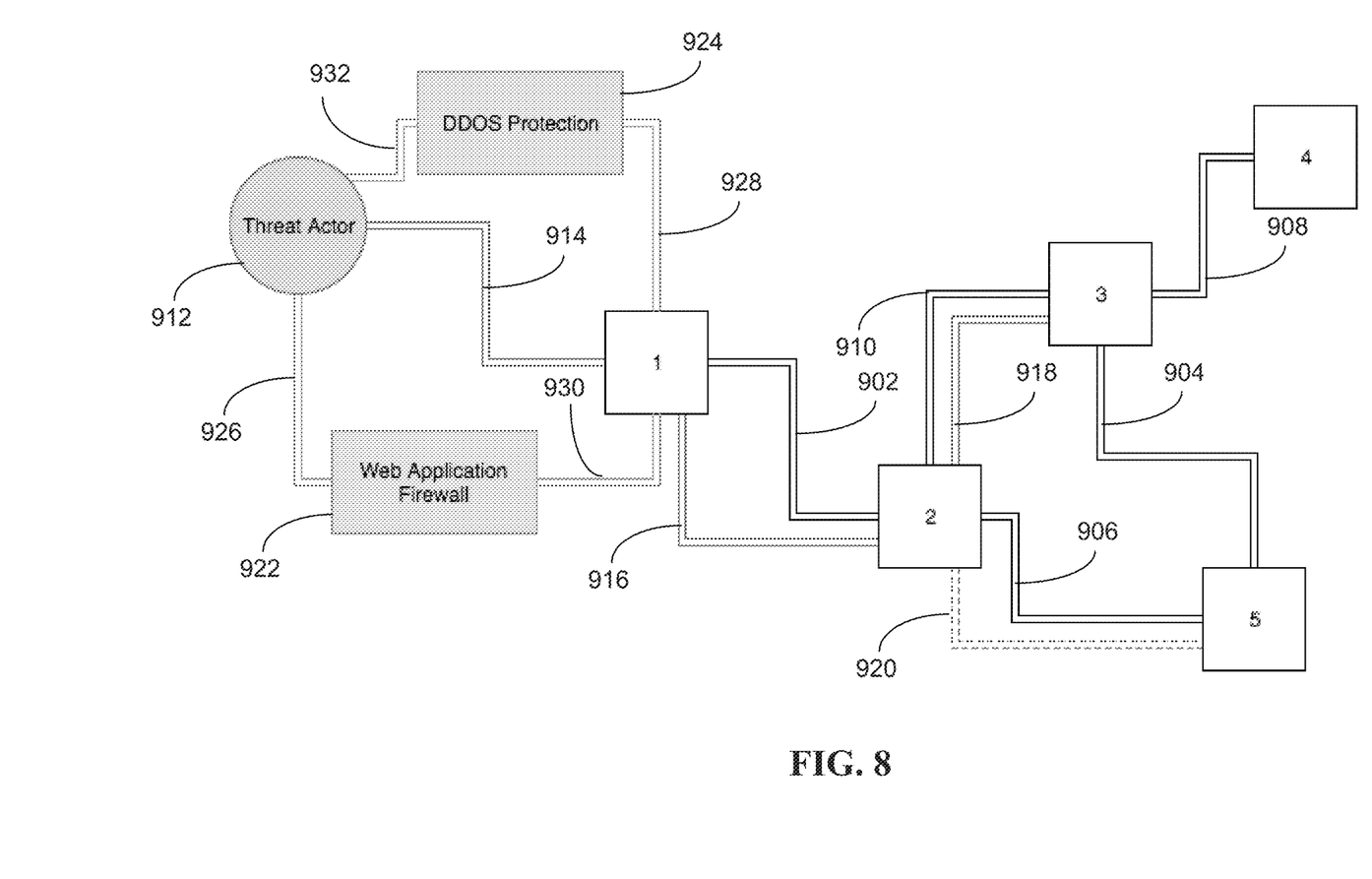
FIG. 8 shows an exemplary visualization flow of the multi-layered structure of FIG. 2.

FIG. 8 shows an exemplary visualization flow of the multi-layered structure of FIG. 2. This visualization flow can be implemented by the visualization module 116 of the system 100 of FIG. 1. The numbered boxes 1-5 along with their connections 902, 904, 906, 908, 910 represent various components of the base layer 202 of the multi-layered structure 200 of an application ecosystem. For example, the numbered boxes represent applications within the ecosystem and the connections 902, 904, 906, 908, 910 represent relationships/data flows among the applications. The threat actor component 912 and the connections 914, 916, 918 and 920 can be a part of the threat modeling layer 204 of the multi-layered structure 200, where the connections 914, 916, 918 and 920 illustrate the impact of the threat actor 912 on various components of the base layer 202. The DOS Protection component 922 and the firewall component 924, along with the connections 926, 928, 930, 932 can be a part of the security controls layer 206 of the multi-layered structure 200. In some embodiments, if a user activates a toggle switch such that both the threat modeling layer 204 and the security controls layer 206 are visualized, the threat segment 920 between components 2 and 5 of the base layer 202 can be displayed as dotted (or flashing or any other warning fashion) to illustrate that this segment of the threat actor route is mitigated or eliminated by the security controls in the security controls layer 206.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile computing device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile computing device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

It should also be understood that various aspects and embodiments of the technology can be combined in various ways. Based on the teachings of this specification, a person of ordinary skill in the art can readily determine how to combine these various embodiments. In addition, modifications may occur to those skilled in the art upon reading the specification.

What is claimed is:

1. A computer-implemented system for visualizing and analyzing security threats in a suite of software applications, the system comprising:

a visualization module for rendering, on a computer display, a map with components representative of the suite of software applications and relationships among the software applications, wherein the components are displayed in a base layer of the map;

a data flow module configured to simulate a data flow through one or more of the suite of software applications, the data flow module adapted to interact with the visualization module to graphically illustrate on the computer display the simulated data flow through one or more of the components of the map that are representative of the one or more software applications;

a threat modeling module configured to automatically identify one or more security threats in the suite of software applications, the one or more security threats including at least one simulated security threat captured by the simulated data flow, the threat modeling module adapted to interact with the visualization module to graphically depict on the computer display the one or more security threats on the map in a threat modeling layer;

an anomaly detection module configured to predict an impact on at least one of the base layer or the threat modeling layer caused by the simulated security threat;

a security controls module configured to implement software-based security controls for mitigating the one or more security threats identified by the threat modeling module; and a threat update module configured to determine a current state of the one or more security threats, the threat update module adapted to interact with the visualization module to graphically display the current state of security on the map in a threat update layer.

2. The computer-implemented system of claim 1, wherein the base layer visualizes each software application in the suite of software applications as a city and the suite of software applications as a state or country.

3. The computer-implemented system of claim 2, wherein the base layer visualizes each relationship between the software applications as a road between different cities.

4. The computer-implemented system of claim 1, wherein the threat modeling layer visualizes each security threat as a threat actor, a threat target and a displayable vector connecting the threat actor to the threat target, wherein at least one of the threat actor or the threat agent is a component of the map.

5. The computer-implemented system of claim 4, wherein the displayable vector visualizes an attack methodology by the threat actor on the threat target.

6. The computer-implemented system of claim 1, further comprises a learning module configured to automatically detect the one or more security threats in the threat modeling layer using a machine learning algorithm based on historical security threat data.

7. The computer-implemented system of claim 6, wherein the learning module automatically detects the one or more security threats caused by a new component added to the map in the base layer.

8. The computer-implemented system of claim 1, wherein the security controls module is configured to display on the map at least one security control to reflect an effectiveness level of the at least one security control.

9. The computer-implemented system of claim 1, wherein the threat update module is configured to determine the current state of the one or more security threats by comparing a real-time snapshot of traffic in relation to one or more components on the map with a baseline state of traffic in relation to the same components.

10. A computer-implemented method for visualizing and analyzing security threats in a suite of software applications, the method comprising:
visualizing in a computer display, as components in a base layer on a map, the suite of software applications and relationships among the software applications;
simulating a data flow through one or more of the software applications;
graphically illustrating on the computer display the simulated data flow through one or more components of the map that are representative of the one or more software applications;
automatically identifying one or more security threats in the suite of software applications, the one or more security threats including at least one simulated security threat captured by the simulated data flow;
graphically depicting on the computer display the one or more security threats on the map in a threat modeling layer;
implementing security controls for mitigating the one or more security threats identified by the threat modeling layer;
determining a current state of the one or more security threats; and
graphically depicting on the computer display at least one of (i) a security controls layer illustrating the security controls applied to one or more components on the map or (ii) a security update layer illustrating the current state of security.

11. The computer-implemented method of claim 10, further comprising predicting an impact on one or more entities in at least one of the base layer or the threat modeling layer caused by the simulated security threat.

12. The computer-implemented method of claim 10, wherein visually identifying one or more security threats comprises visualizing each security threat as a threat actor, a threat target and a displayable vector connecting the threat actor to the threat target, wherein at least one of the threat actor or the threat agent is a component of the map.

13. The computer-implemented method of claim 10, further comprising using a machine learning algorithm to automatically detect the one or more security threats in the threat modeling layer based on historical security threat data.

14. The computer-implemented method of claim 13, wherein the machine learning algorithm automatically detects the one or more security threats after a new component is added to the map corresponding to the base layer.

15. The computer-implemented method of claim 10, further comprising displaying in the security controls layer at least one of the security controls to reflect an effectiveness level of the security control.

16. The computer-implemented method of claim 10, wherein determining a current state of the one or more security threats comprises comparing a real-time snapshot of traffic of one or more components on the map with a baseline state of traffic of the same components.

\* \* \* \* \*